United States Patent [19]
Dombrosky et al.

[11] Patent Number: 5,099,449
[45] Date of Patent: Mar. 24, 1992

[54] INDUSTRIAL CONTROLLER WITH VARIABLE I/O UPDATE RATE

[75] Inventors: Dennis J. Dombrosky, Willoughby Hills; Kendal R. Harris, Mentor, both of Ohio

[73] Assignee: Allen-Bradley Company, Inc., Milwaukee, Wis.

[21] Appl. No.: 381,141

[22] Filed: Jul. 17, 1989

[51] Int. Cl.⁵ .................................. G06F 15/46
[52] U.S. Cl. .................................. 395/800; 364/949; 364/949.3; 364/949.4; 364/949.91; 364/941.6; 364/941.1; 364/941.3; 364/DIG. 2
[58] Field of Search ... 364/200 MS File, 900 MS File, 364/468

[56] References Cited

U.S. PATENT DOCUMENTS

| | | | |
|---|---|---|---|
| 3,587,054 | 6/1971 | Byrne et al. | 364/900 |
| 3,815,099 | 6/1974 | Cohen et al. | 364/900 |
| 3,942,158 | 3/1976 | Dummermuth | 364/900 |
| 3,969,703 | 7/1976 | Kwiatkaski et al. | 364/900 |
| 4,165,534 | 8/1979 | Dummermuth et al. | 364/900 |
| 4,442,504 | 4/1984 | Dummermuth et al. | 364/900 |
| 4,807,108 | 2/1989 | Ben-Arieh et al. | 364/148 |
| 4,876,664 | 10/1989 | Bittorf et al. | 364/900 |
| 4,937,777 | 6/1990 | Flood et al. | 364/900 |
| 4,956,784 | 9/1990 | Hadavi et al. | 364/468 |

Primary Examiner—Thomas C. Lee
Assistant Examiner—Larry Donaghue
Attorney, Agent, or Firm—Quarles & Brady

[57] ABSTRACT

An industrial controller has an I/O scanner that may scan I/O modules at differing rates depending on the intrinsic bandwidth of the controlled process variable. The user defines an update rate for each I/O module reflecting the bandwidth of its associated variable. The scanner continuously updates a table of I/O events for each I/O module or I/O rack listing permissive and mandatory I/O execution times associated with each event. Using this event table, the I/O scanner determines the next I/O module to be serviced. If the event cannot be serviced on schedule, indication of an event slip is reported to the controller.

3 Claims, 8 Drawing Sheets

INDUSTRIAL CONTROLLER WITH VARIABLE I/O UPDATE RATE

BACKGROUND OF THE INVENTION

This application relates to I/O scanners associated with industrial controllers and more particularly to a method of updating different I/O modules at different rates.

Industrial controllers such as those described in U.S. Pat. Nos. 3,810,118; 3,942,158, 4,165,534 and 4,442,504 are typically connected to industrial equipment such as assembly lines or machine tools to operate such processes or equipment in accordance with a stored program. In industrial controllers, such as those disclosed in the above cited patents, the stored program includes instructions which, when executed, examine the condition of selected inputs to the controller from sensing devices on the controlled equipment and energize or de-energize selected outputs from the controller to operate devices on the controlled equipment. Inputs to the controller may be discrete binary signals such as those from switches which may detect limits of process variables such as motion, temperature, time, or other quantities, or the inputs may be analog measures of the process variables themselves, which are generally then converted to digital binary form for processing.

Likewise, the outputs of the controller may be either binary outputs as implemented by mechanical or solid-state relays, or analog outputs produced by means of a digital to analog converter.

Inputs and outputs to the controller are processed through I/O modules which may be remotely located from other portions of the industrial controller and connected by means of a communications "link". For discrete inputs and outputs, such as those from limit switches or to relay coils, the controller transmits or receives a single binary bit of data which defines the status of a single discrete input or output at the I/O module. Typically, the signals for a number of such discrete inputs and outputs are grouped in packets for transmission on the link.

Communication with other modules such as an analog-to-digital ("A/D") or digital-to-analog ("D/A") converters may require the transmission or reception of several binary words of data. Such multiple bit transfers are termed block transfers, referring to the block of data that is transmitted through the link and such I/O modules are termed "block transfer modules".

To update all of the I/O modules, the controller employs a circuit called an I/O scanner which couples both types of I/O modules: discrete modules and block transfer modules to the controller. At any given time, the I/O scanner may update all of the discrete modules in an adapter or a single block transfer module within an adapter. An adapter of discrete modules or a block transfer module will each be termed an I/O "unit" reflecting this communication protocol.

The I/O scanner, periodically reads each I/O unit and records its status in an input image table contained in the scanner's memory and copied to the controller's memory. Conversely, the I/O scanner periodically writes part of the output image table portion of its memory to the remotely located output modules. The scanner's I/O image table reflects the current state of the I/O modules, and its purpose is to permit the industrial controller to rapidly access the input and output data without the need for communicating over the I/O link. Since the controller performs its logical operations based on the state of this I/O image table, it is important that the I/O image table accurately reflect the most current state of the I/O units.

The period of time between the repeated scanning of a single I/O unit in consecutive I/O scanner cycles is termed the "update rate", whereas the number of I/O units updated within a given time period is termed the "scan rate". The I/O scan rate is determined primarily by the speed of the I/O scanning hardware and the speed of the communications link whereas the update rate is also a function of how many I/O units are on the link.

A high update rate is necessary for I/O units connected with process variables that may change rapidly. For example, a safety limit switch on a high speed press might require a high update rate: the switch may change state quickly at any time and requires frequent monitoring. On the other hand, an I/O unit monitoring the height of liquid in a tank from an inlet that is small comparison to the tank, does not require constant monitoring. The liquid height changes slowly and predictably. The distinction between low and high update rates is both one of the speed of change of the process variable and predictability of change of the process variable. Henceforth, the term "high information bandwidth" will be used to refer to process variables, either inputs or outputs, that require high update rates.

Generally the update rate for all I/O units is the same and is equal to the period of the I/O scanning cycle, that is, the time required for the I/O scanner to update each I/O unit once. Therefore, the minimum scan rate required of a typical I/O scanner is determined by the update rate of the single I/O unit connected to the highest information bandwidth process variable times the number of I/O units.

The product of the minimum necessary update rate and the number of scanned I/O units will be termed the "scanner service limit". For complex industrial processes, the number of I/O units required can be large and one or more of the variables may have a high information bandwidth.

Accordingly, considerable effort has been devoted to increasing the scanner service limit. Primarily, efforts to improve the scanner service limit have focussed on increasing scan rates through the use of high speed links and faster I/O scanner hardware and protocols. For example, U.S. Pat. No. 4,404,651 entitled "Programmable Controller For Using Coded I/O Technique" issued Sept. 13, 1983, and U.S. Pat. No. 4,442,504 entitled "Modular Programmable Controller" issued Apr. 10, 1984, describe methods for increasing scan rates by selectively transmitting only data that has changed since the last scan.

A given high information bandwidth variable in a complex industrial process may require updating at no less than a given interval. With present scanners, however, the update rate is difficult to calculate and cannot be guaranteed. The addition of I/O units to a link, for example, will generally decrease the update rate. An increased number of I/O "reads" or "writes" could also slow the update rate. Prior I/O scanners do not have the ability to provide information to the industrial controller which indicates the update rate of a given scanned I/O unit.

SUMMARY OF THE INVENTION

The present invention relates to an I/O scanner for an industrial controller in which the I/O units serviced by the I/O scanner are updated at different, configurable rates. More specifically, the present invention includes an image table which holds I/O data to be transmitted to I/O units or that has been received from I/O units. The I/O image table is updated in response to I/O update "events". The timing of each event is determined by a scheduler routine which reads data from an event table to determine the next event to be performed.

It is therefore one object of the invention to provide a means of accurately specifying and verifying the update rate of a given I/O unit. The user provides the I/O scanner with data in the form of an I/O configuration file which specifies the desired update rate of each I/O module. If, given the constraints of the system, including link speed, number of other I/O units and update rates of other I/O units, the update rate is not achieved, the I/O scanner provides the industrial controller with a message indicating a schedule "slippage". The absence of such a message verifies to the user that the specified update rate is being achieved.

An I/O scanner according to the present invention also increases the scanner service limit by decreasing the average update rate required by the I/O units. This is accomplished by permitting the I/O units to be updated at different rates which allows the user to tailor the update rate for each I/O unit to the information bandwidth of the process variable being controlled.

It is therefore another object of the invention to improve the scanner service limit without increasing the I/O scan rate. In general, a controlled process has both high information rate and low information rate process variables. By specifying lower update rates on I/O units associated with low information bandwidth process variables, those I/O units will not be scanned with every I/O scanning cycle. This results in a reduction in the average number of I/O units scanned per cycle allowing an increased number of I/O units to be scanned. Alternatively, decreasing the update rate for certain units may allow higher update rates for other I/O units which also increases the scanner service limit.

An I/O scanner constructed according to the present invention orchestrates the scanning of a variety of I/O units with different update rates by creating an event table listing the different I/O events that must be performed for each I/O unit. This table contains time values indicating the earliest and latest time at which the I/O event may be performed.

A scheduler program searches the event table to find the next event which may be performed (a permissive event) and the next event which must be performed (a mandatory event) and, based on estimates of the time required to perform the I/O event, selects either the next mandatory or the next permissive event in the event table. The scheduler functions to dynamically order the events so as to accommodate uncoordinated update times while preventing "collisions" between events, within the constraint of the I/O scanner performance. As each event is executed, the entry in the event table is updated for future reference by the scheduler program.

Accordingly, it is another object of the invention to permit the assignment of varying update times to different I/O units without the need for the programmer to consider possible conflicts between event update times.

The assignment of permissive and mandatory event times to each event gives the scheduler program the necessary leeway to avoid conflicts between similarly scheduled events. The scheduler assigns priority to the earliest permissive event except if its execution would occlude the execution of a mandatory event. By constantly seeking the earliest permissive event the scheduler avoids future event "bottlenecks" which could produce event conflicts.

It is another object of the invention to eliminate the need for a "master" schedule fixing each I/O event in time over a large number of I/O scanning cycles. The use of an event table and the rapid scheduling technique employed by the scheduler allows a dynamic schedule to be created in real time. The scheduler need only determine the next permissive event and the next mandatory event to make a decision on the next event to be processed. The decision rule for the selection of the next event tends to eliminate event conflicts and thus avoids the calculations that would be required to look further ahead in event scheduling. The dynamic scheduling frees the considerable memory that would otherwise be required to store a master schedule.

It is accordingly another object of the invention to prevent repetitive collisions between events if a collision does occur. The event table is updated based on the actual execution time of the I/O event. Therefore, I/O events with identical update times will tend to be "staggered" by the scheduler in subsequent executions, once an initial conflict is resolved.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
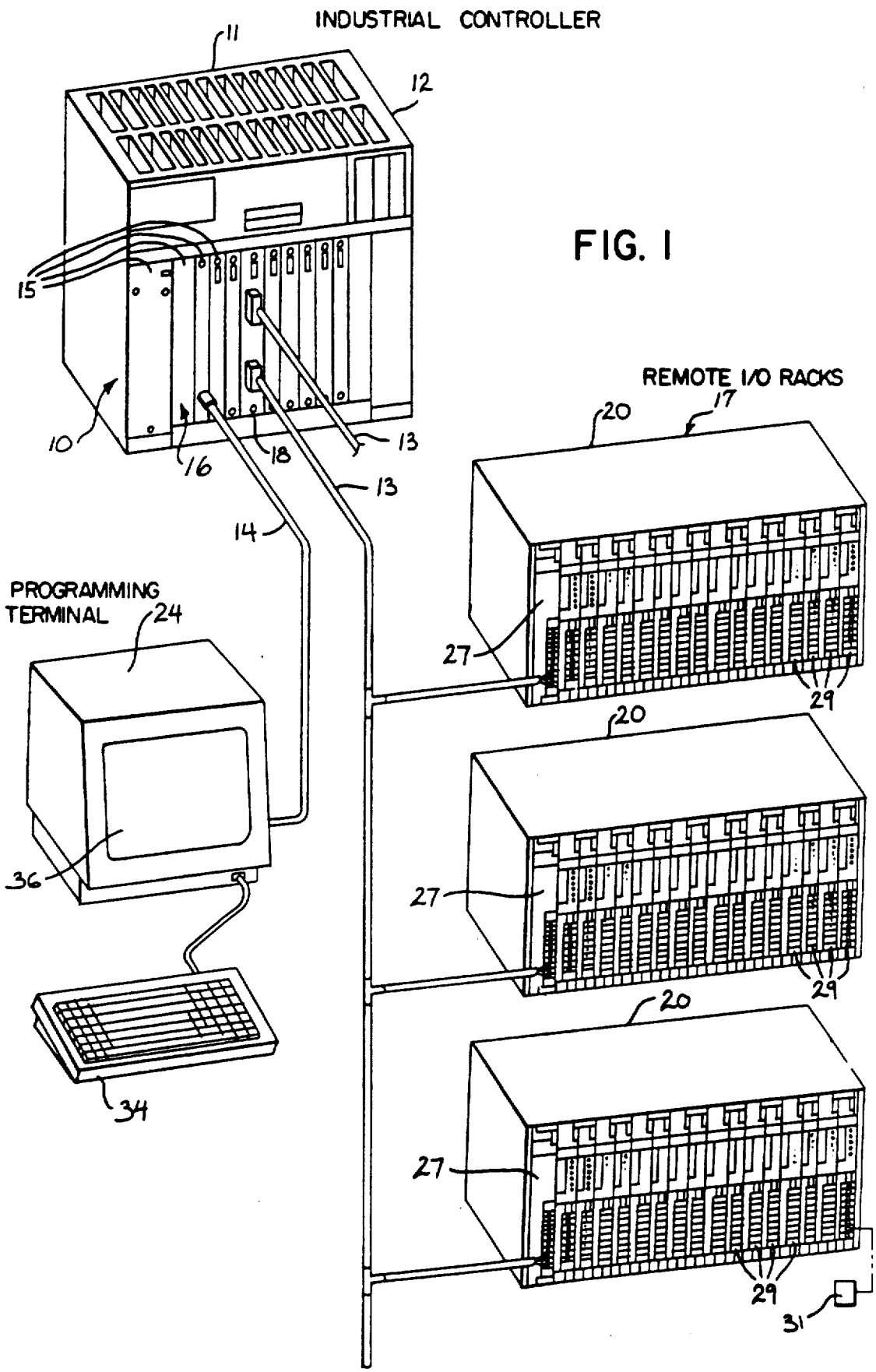
FIG. 1 is a perspective view of a host computer which incorporates the present invention.

Hardware:

With initial reference to FIGS. 1 and 2, an industrial controller 10 incorporating the present invention is comprised of a host computer 16 housed in a rack 12 which includes a series of slots that receive a plurality of printed circuit board modules 15 making up the host computer 16 and the I/O scanner 18 to be discussed below. These modules connect to a backplane 11 which extends along the rear surface of the rack 12. The backplane 11 has a plurality of module connectors which are connected by a conductive pattern on the backplane 11 providing a high speed bus 26 made up of control lines 21, data lines 22 and address lines 23, interconnecting modules 15. A detailed description of a high speed bus suitable for use with the invention is given in U.S. Pat. No. 3,815,099 issued June 4, 1974, and entitled "Data Processing System".

The host computer 16 may be a mini-computer such as the MicroVAX II manufactured by Digital Equipment Corporation, Inc. The host computer 16 executes a user defined application program, stored in the host computer's random access memory ("RAM"), to operate the equipment connected to the industrial controller 10. A programming terminal 24 is connected by a cable 14 to the host computer 16 for monitoring the operation of the industrial controller and for programming the host computer 16.

The I/O scanner 18, contained in rack 12, electrically interfaces the host computer 16 to remotely located I/O racks 20. The I/O scanner 18 communicates with the host computer 16 via the backplane 11, and it communicates with the I/O racks 20 via serial data links 13.

Each I/O rack 20 includes a remote I/O adapter 27 and a number of I/O modules 29. The I/O adapter 27 receives signals from the links 13 and communicates the signals to the appropriate I/O module 29 via a backplane 17. The I/O modules 29 interface the industrial controller 10 via the I/O adapters 27 and the I/O scanner 18 to external devices on the controlled equipment 31. Each I/O module 29 can have solely an input function, solely an output function, or both input and output functions. I/O modules 29 which provide an input function, couple the host computer 16 to sensing devices on the controlled machine, while the I/O modules 29 which have an output function couple the host computer 16 to operating devices on the controlled machine. Each of the I/O modules 29 may further be distinguished, for example, as an a.c. input or output device, a d.c. input or output device, or as an input/output interface to an analog device, such as a resolver or a position indicator. A typical application includes a mix of different types of I/O modules 29.

Figure 2:
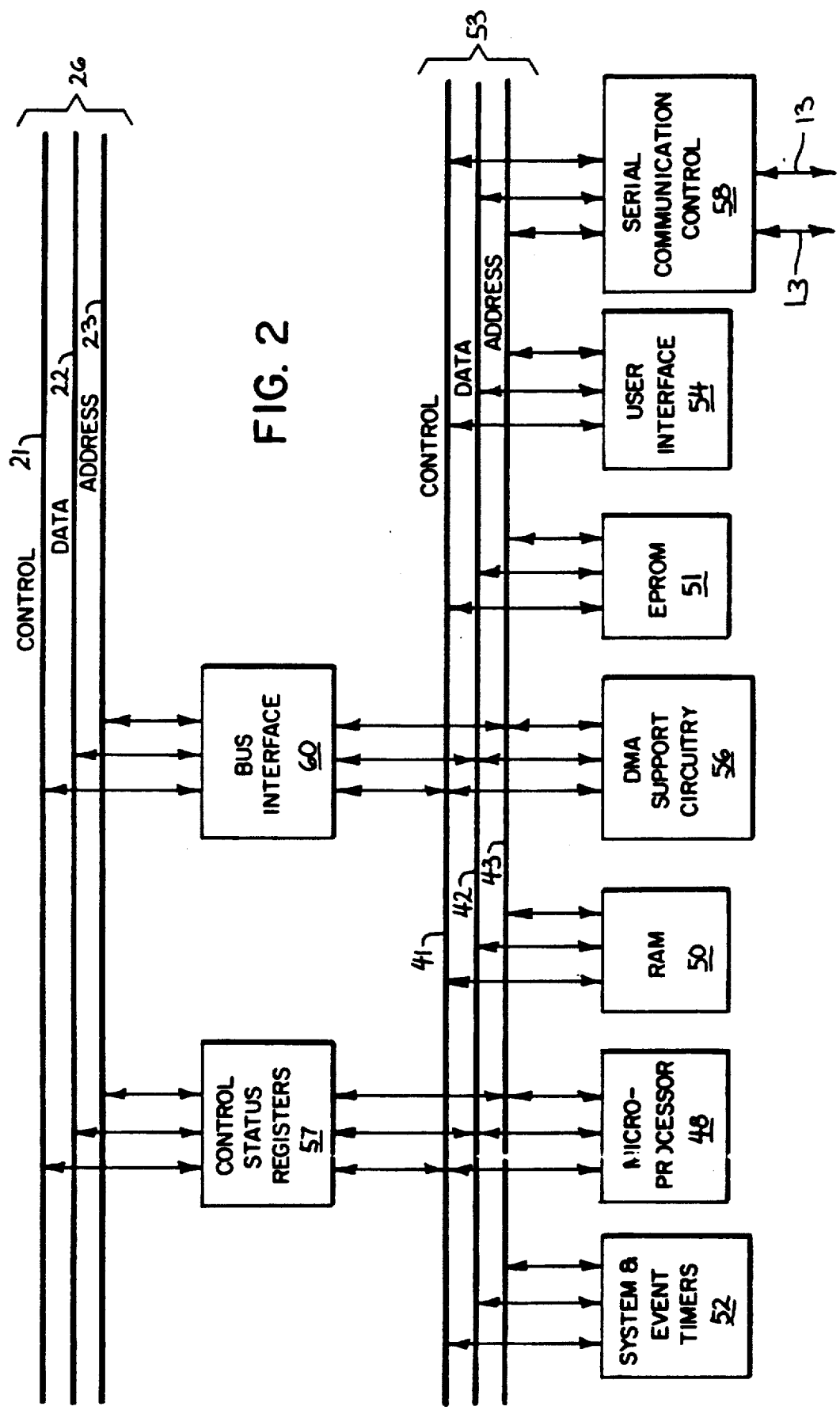
FIG. 2 is a schematic block diagram of the I/O scanner shown in FIG. 1.

Referring to FIG. 2, the I/O scanner 18 includes a 16 bit microprocessor 48, such as the 68010 manufactured by Motorola, Inc., an erasable programmable read-only-memory ("EPROM") 51 which holds an initialization program for the I/O scanner 18, a RAM 50 which receives a more complex operating program from the host computer 16 during the I/O scanner 18 initialization and which holds various parameters of operation, and a user interface 54 which provide connections to the I/O scanner's front panel for certain status indicators (not shown).

The I/O scanner 18 also includes system and event timers 52 which provide timing control signals for data transfer and a real time clock used in servicing the I/O modules 29 to be described further below and DMA support circuitry 56, and for communication with the processor 16 through direct RAM data transfers.

A serial communications control 58 provides interface circuitry and control for the two serial data links 13 which connect the I/O adapters 27 to the I/O scanner 18 The serial communication circuitry uses the Z-SCC Serial Communications Controller manufactured by Zilog, Inc., Cupertino, Calif.

The above listed elements of the I/O scanner 18 are interconnected by an internal bus 53 comprised of a set of three buses: a control bus 41 consisting of a number of individual control lines running between different components, a parallel data bus 42 and a parallel address bus 43. The internal bus 53 is in turn connected with the high speed bus 26, extending along the backplane 11, by means of bus interface 60 and control status registers 57. Bus interface 60 works in conjunction with DMA support circuitry 56 to perform high speed direct memory access ("DMA") data transfers between the host computer 16 RAM and the I/O scanner RAM 50. The protocol of this DMA is described in U.S. Pat. No 3,815,099 entitled "Data Processing System" and issued June 4, 1974.

Host computer 16 may also communicate with the I/O scanner 18 through a set of controlled status registers ("CSR") 57, which may be read from and written to from either the internal bus 53 or the high speed bus 26. The CSR's 57 are used to send commands to the I/O scanner 18 and to transfer the address data used for the DMA transfers and for fault information.

Data Structures

I/O Scanner RAM

Figure 6:
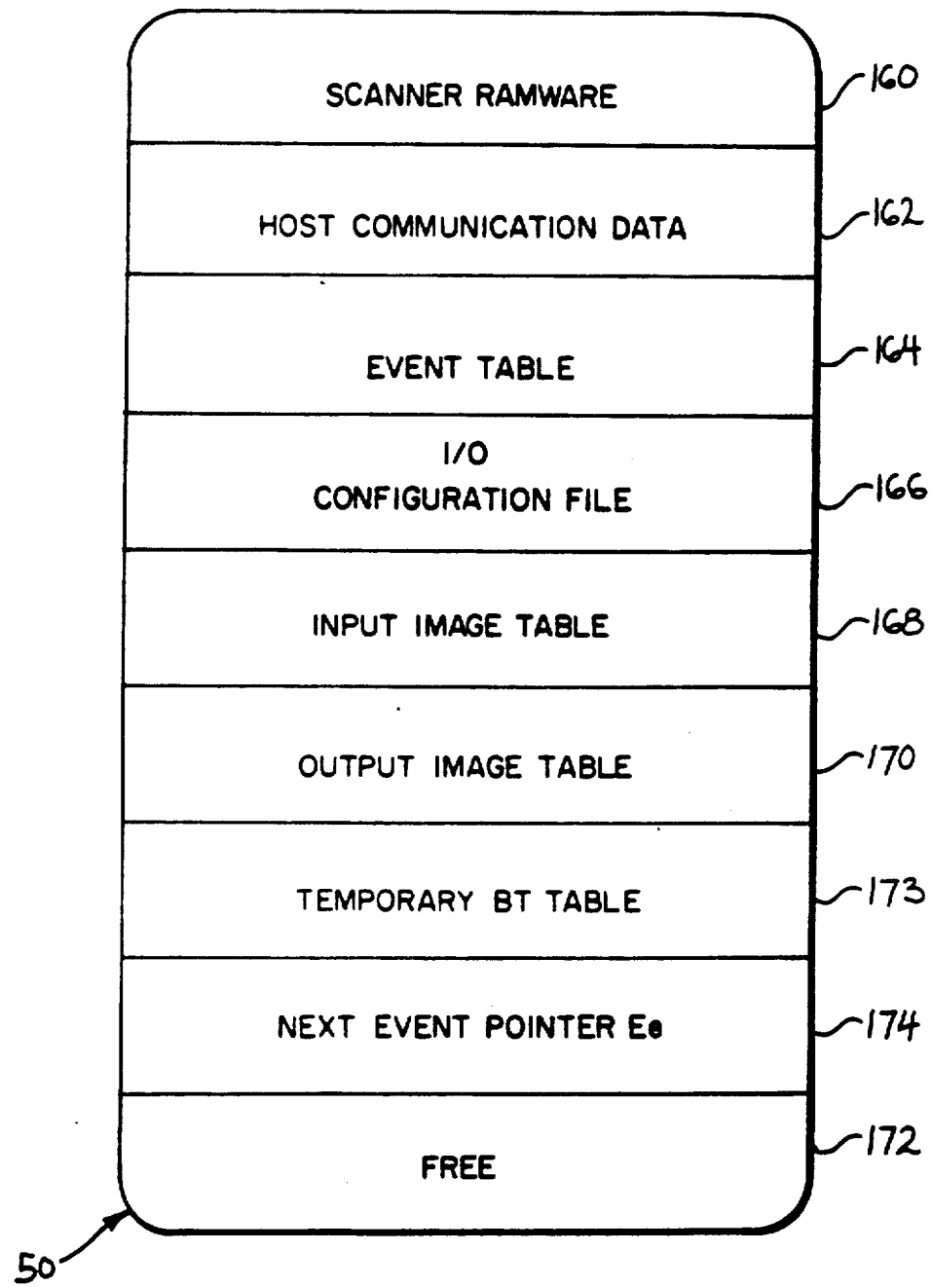
FIG. 6 is a conceptual diagram of the I/O scanner's memory structure.

As mentioned, RAM 50, shown schematically in FIG. 6, contains both data and certain operating programs which are down-loaded from the host computer 16 during I/O scanner initialization. The down-loaded scanner program ("RAM-ware") 160, controls the general operation of the I/O scanner 18 and will be described in detail below. Also stored in RAM 50 is the host communication data 162 which defines the parameters required for DMA transfers between the host computer 16 and the I/O scanner 18.

The I/O configuration file 166, which holds information describing the type of I/O adapters 27 and I/O modules 29 to be scanned, their addresses, and importantly, their frequency of update, is also stored in RAM 50. The source data for the I/O configuration file is compiled from an I/O definition file (not shown) which is a standard text file which may be created by the programmer using a text editor on the host computer 16. The structure and elements of the I/O configuration file 166 will be discussed in detail below.

Also maintained in RAM 50 is the current status of each input and output of discrete I/O modules 29 which are stored in input image table 168 and output image table 170 respectively. A temporary "image" table holding information for the block transfer modules 173, and next event pointers $E_e$ 174, the latter to be described in detail below, are also stored in RAM 50. RAM 50 also provides unallocated storage location 172 for storing counters, timers and intermediate computational values used by the microprocessor 48 in executing the I/O scanning program.

I/O Configuration File

An I/O definition file is first created by the programmer and entered as a text file into the host computer 16. At the initialization of the I/O scanner 18, (FIG. 3) the information of the I/O definition file is down-loaded at process block 104 into the I/O scanner RAM 50 as the I/O configuration file 166.

Figure 8:
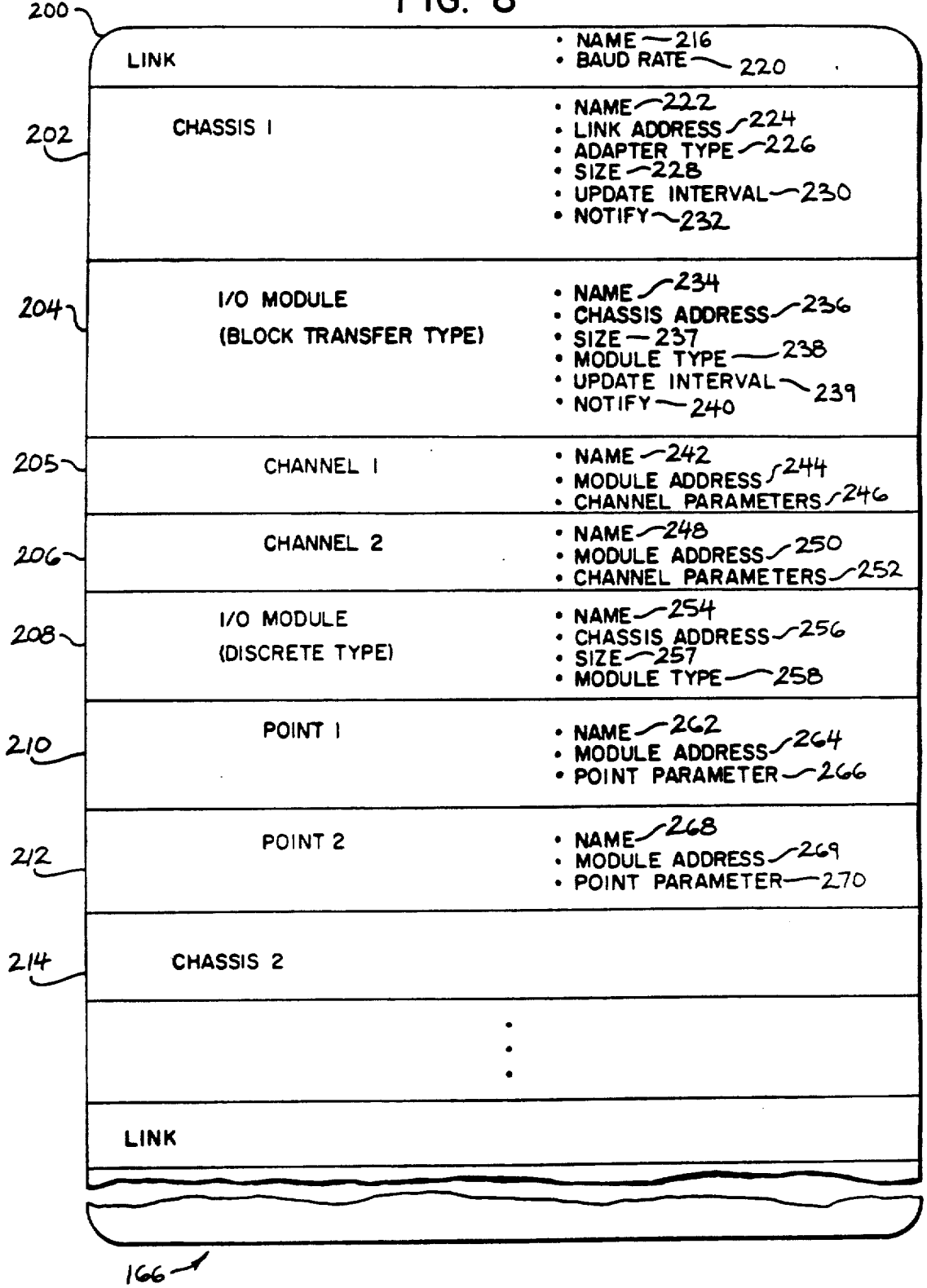
FIG. 8 is a representation of the I/O Configuration file used to construct the Event Table.

Referring to FIG. 8, the I/O configuration file 166 is comprised of a series of records which identify the addresses and type of the I/O modules 29 on the link 13, and the update rates for the I/O modules 29. The first record in the I/O configuration file 166 is a Link record 200 which indicates to which of the two links 13 the I/O module records 204 and 208 following the Link record 200 are associated. The first element of this record, Link Name 216, may be A or B which identifies either of the two links 13. The Link record also has as an element, a link Baud Rate 220, which is used by the scanner program to calculate the duration of a given I/O event.

The second record type is a Chassis record 202 which holds information defining the I/O racks 20 attached to the preceding defined link 13. The Chassis record contains:

a Name 222 or label for the I/O rack, or chassis, used to assist the programmer in addressing the chassis, a Link Address 224 of the chassis or rack 20 on the link, an Adapter Type 226 used on the chassis, which determines the proper adapter communications protocol, and a Size 228 of the chassis which indicates the number of I/O modules that may be attached to the I/O rack 20.

The Chassis record 202 also holds an Update Interval 230 for the chassis, which defines how frequently the discrete I/O modules in the chassis will be updated. The Chassis record 202 also contains a Notify Flag 232 which indicates to the scanner software whether the I/O scanner 18 should report the completion of the scan of this chassis to the process controller 16. More than one Chassis record 202 may follow a Link record 200 depending on the number of chassis 19 attached to the link 13.

Following each Chassis record 202 is one or more Module records of either of two types: a block transfer I/O Module record 204 or a discrete I/O Module record 208. Block transfer I/O modules may be, for example, A/D or D/A converter modules which require the communication of a number of data words during each I/O scanning event. A block transfer I/O Module record contains:

the Name 234 or label of the I/O module, used to aid the programmer in addressing the module, the Chassis address 236 of the I/O module, the Size 237 of the module in channels of analog data, the Type 238 of module, the Update Interval 239 of the module, which instructs the I/O scanner 18 how frequently to update the module, and a Notify flag 240 which indicates whether the I/O scanner 18 should notify the host computer 16 on completion of a I/O scan of that module.

A block transfer I/O Module record 204 is in turn followed by one or more Channel records 205, 206 which contain the operating parameters 246, 252 of each channel of the I/O module. For example, an A/D converter module requires parameters defining the range of voltage or current inputs and the scaling factors. The Channel records 205, 206 like the preceding records, also includes a Name 242, 248 or label to assist the programmer in addressing the channel and a channel address 244, 250.

Discrete Modules are primarily sets of AC or DC single bit inputs or outputs which require the communication of only a single word during each I/O scanning event. A discrete Module record contains:

the Name 254 or label of the module, used to aid the programmer in addressing the module, the Chassis address 256 of the module in the chassis, the Size 257 of the module in bits, and the Type 258 of module.

A discrete Module record 208 does not contain an update interval nor a notify flag, each of which is adopted from the preceding Chassis record 202.

A discrete I/O module record is in turn followed by one or more Point records 210, 212 which contain a Name 262, 268 or label for the data point, to assist the programmer in addressing the point, and a module address 264, 269 which defines the physical wire terminal on the I/O module to which the point is connected, and a point parameter 266, 270 which may be either "input" or "output".

The data in the configuration file 166 is used in creating the event table 164, in addressing the I/O modules 29 and in the scanning program to be described in detail below.

Event Table

Referring to FIG. 6, the event table 164 is held in RAM 50 and used by the scanner program in scheduling I/O events and is derived from the configuration file 162 as previously described. Events are actions that the I/O scanner 18 must execute at a given time, e.g. an I/O update for a particular module. Each I/O module 29 may have one or more events associated with it, depending on the I/O module type as defined in the I/O configuration file 166.

Figure 7:
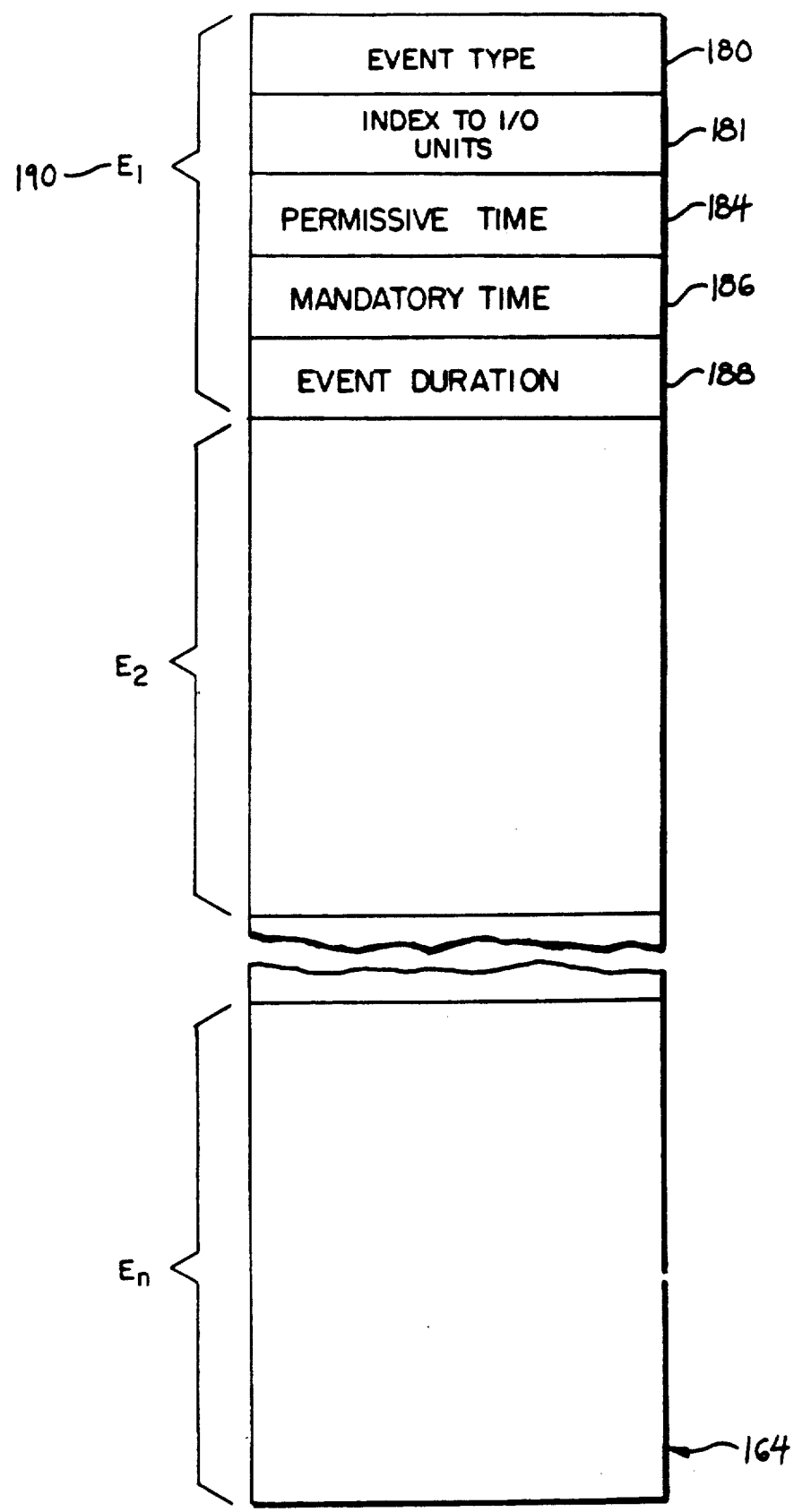
FIG. 7 is a conceptual diagram of the memory structure for the Event Table scanned by the Scheduler Routine of FIG. 5.

Referring to FIG. 7, each event $E_1$ to $E_n$ is identified by six elements of data 180-188 contained in the event table 164. The structure of a first event $E_1$, 190 in the event table 164 is shown. Although only $E_1$ will be described, the same structure is repeated for each event $E_1$ to $E_n$.

The first data element in $E_1$, in the event table 164, is the event type 180. An event Type may be of one of four general categories:

(a) an input to or output from a discrete I/O module;

(b) a transmission of a master control byte ("MCB") to a block transfer type I/O module;

(c) a query to an adapter to ask if it is ready for a block transfer;

(d) an input or output to a block data transfer type of I/O or;

Discrete I/O modules have only a single event type (a). Block transfer I/O modules such as A/D converters, which require multiple word transfers, may have event types (b)-(d). The MCB event (b) initializes the block transfer I/O module for a block transfer. The query event (c) follows this initialization and signals the block transfer I/O module to signal when it is ready for a block transfer. Event (d) is the actual data transfer.

The second data element 181 of $E_1$ and of each event of the event table 164 is an index which provides the link address to the associated I/O unit and other configuration information. This information is derived from the I/O configuration file 166 as previously described according to methods understood in the art.

The third and fourth data elements $T_1$, and $T_2$ are the permissive and mandatory event times respectively. The permissive event time $T_1$ is the first time, as measured against the I/O scanner real-time clock 52, that the event may be executed The mandatory event time $T_2$ is the last time, as measured against the real time clock 52, by which the event must be executed.

$T_1$ and $T_2$ are calculated from the event interval I which indicates the time before the next update of the I/O unit 29 associated with the event $E_1$. The event interval I is programmed by the user of the industrial controller 10 as dictated by the demands of the process being controlled and is entered as one of the elements of the I/O configuration file 166. I is typically a positive decimal fraction indicating the duration of the interval between events in seconds. A negative value of I is interpreted to mean that the time between $T_1$ and $T_2$ is equal to $T_0$ plus the maximum interval allowed by the I/O scanner: in the preferred embodiment, approximately 32 seconds.

For example, if the interval value I is positive, $T_1$ and $T_2$ are derived from the event interval I by adding I to the last time the event actually was performed, $T_0$, to produce $T_1$, and adding I plus a fixed percentage of I to the last time the event was performed $T_0$ to produce $T_2$. The fixed percentage used to compute $T_2$ is 20% of I in the preferred embodiment. The difference between $T_1$ and $T_2$ is termed the event "window" and defines the time period during which the event should be executed. At initialization of the I/O scanner, $T_0$ is set equal to 0 and from then on, $T_0$ is set equal to the value of the real time clock 52 at the time the event was performed.

If the event interval I is negative, indicating a maximum event window, $T_1$ is determined by adding the absolute value of the event interval I to the last time the event was executed, $T_0$, and setting $T_2$, equal to the maximum delay time of 32 seconds.

The fifth and final data element 188 in the event table 164 is the estimated duration of the event execution, ED. The event duration ED is generally dependant on the type of I/O module associated with the event, the length of the block transfer, if any, and the speed of communication permitted by the link 13. ED is derived from the identifying information about the I/O modules contained in the I/O configuration file 166, specifically the link baud rate 220, the adapter type 226 and the I/O module types 238, 258 stored in RAM 50. As an example, the ED 188 for a discrete I/O module connected to a 57 kilobaud link would be approximately 11 ms and 7 ms for the same module connected to a 115 kilobaud link.

The data elements of each event $E_1$ to $E_n$, in the event table 164, are determined in a similar fashion.

Scanner Operation

Figure 3:
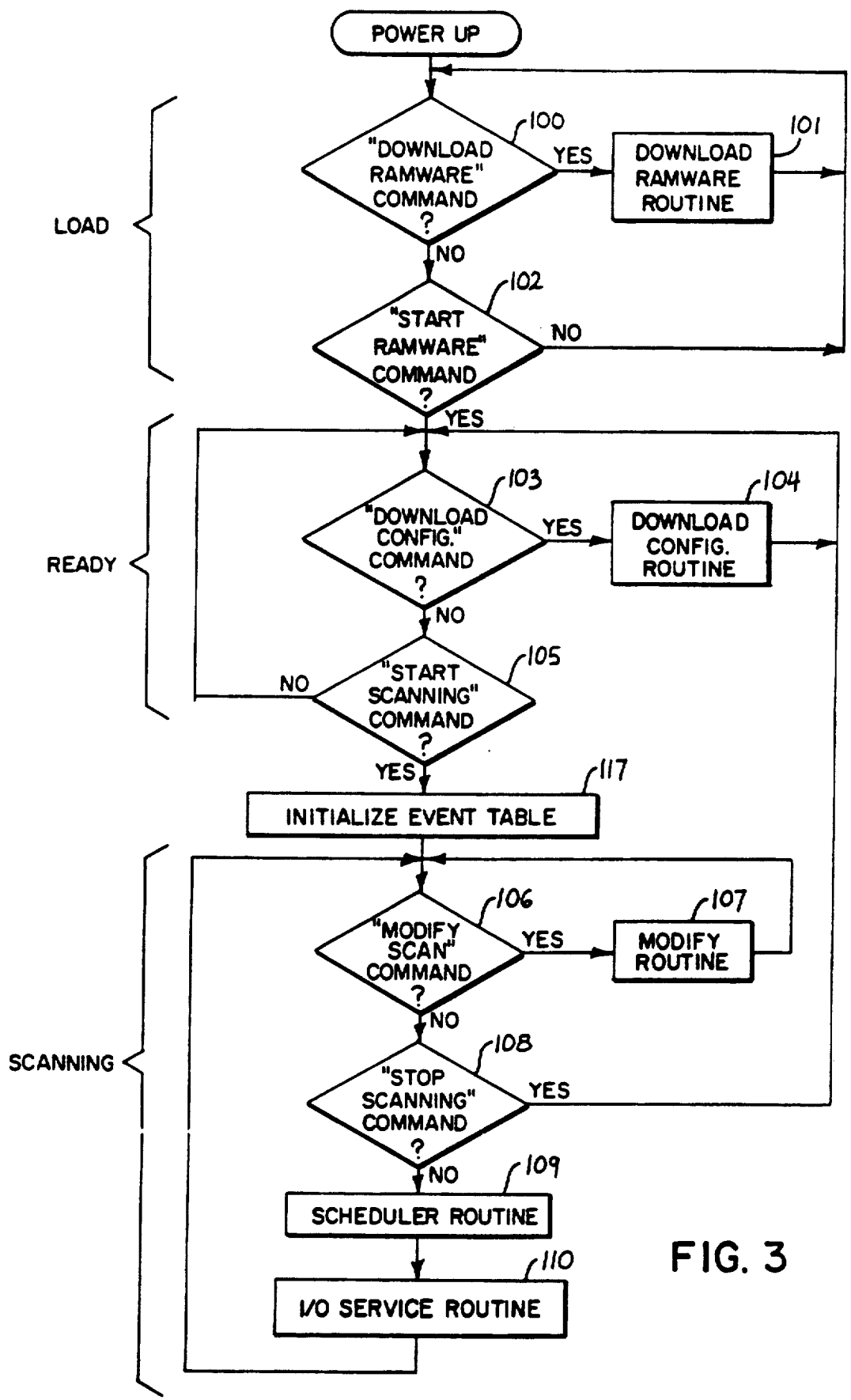
FIG. 3 is a flow chart of the I/O Scanner Control program executed by the I/O scanner of FIG. 2.

With reference to the data structures of the I/O scanner, including I/O scanner RAM 50, the event table 164, and the configuration file 166, the operation of the I/O scanner will now be described. Referring to FIG. 3, the I/O scanner may be in one of four modes: LOAD, READY, SCANNING and FAILED. The I/O scanner may execute different commands received from the host computer 16 depending on its mode.

Load Mode

The LOAD mode is entered after I/O scanner power-up or after a I/O scanner reset and in this mode, the I/O scanner may execute the download ramware, and start ramware commands. These commands are transmitted through the backplane buses 21-23 to the I/O scanner 18 by means of the CSR's 57. If a download ramware command is received at decision block 100, then at process block 101, RAM 50 is loaded with the main scanning program to be executed by the I/O scanner 18, by means of a DMA transfer from the host computer 16 RAM to the I/O scanner RAM 50. If at decision block 102 a start ramware command is received through the backplane buses 21-23, the ramware is verified by checksum and the I/O scanner 18 advances to the READY mode. If a start ramware command is not received at process block 102, the program loops back to process block 100 to test for a download ramware command.

In the READY mode, the I/O scanner first checks for a download config command at decision block 103. If this command is received, the host computer 16, loads RAM 50 with information from the I/O configuration file 166 as indicated by process block 104. As has been described, the I/O configuration file 166 is generated by the programmer and contains data reflecting the type of I/O modules 29, their addresses in I/O space and the desired frequency of updating.

After the configuration file 166 has been downloaded by DMA transfer and verified by checksum techniques, the I/O scanner 18 may receive a start scanning command from the host computer 16. Upon receipt of a start scanning command at decision block 105, the event table 164 is initialized per process block 117. If no start scanning command is received, the program loops back to decision block 103 within the READY mode.

Referring to FIG. 7, the event table 164 is initialized with the event type, 180, the index to I/O units 181, the interval 182 and the estimated duration 188 for each event as derived from the configuration file 166 as described above under the description of the event table and configuration file. The permissive times $T_1$ for each event are arbitrarily set to be 50 ms apart to prevent initial conflicts and the mandatory times $T_2$ are set to be equal to their respective $T_1$ times plus 20% of I for that event. After the event table 164 is initialized the I/O scanner moves to the SCANNING mode.

In the SCANNING mode, the I/O scanner first checks for a modify scan command at decision block 106. If this command is received, the scan may be modified, for example, the I/O scanner may poll the host computer 16 for updated event interval I information as indicated by process block 107. The new event interval I information is then loaded into the event table 164.

If no modify scan command is received at decision block 106, the I/O scanner checks for a stop command as indicated by decision block 108. If a stop command is received, the I/O scanner returns to the READY mode, at process block 103. If no stop command is received, the I/O scanner proceeds to the main body of the scanner program indicated by process blocks 109 and 110.

Figure 5:
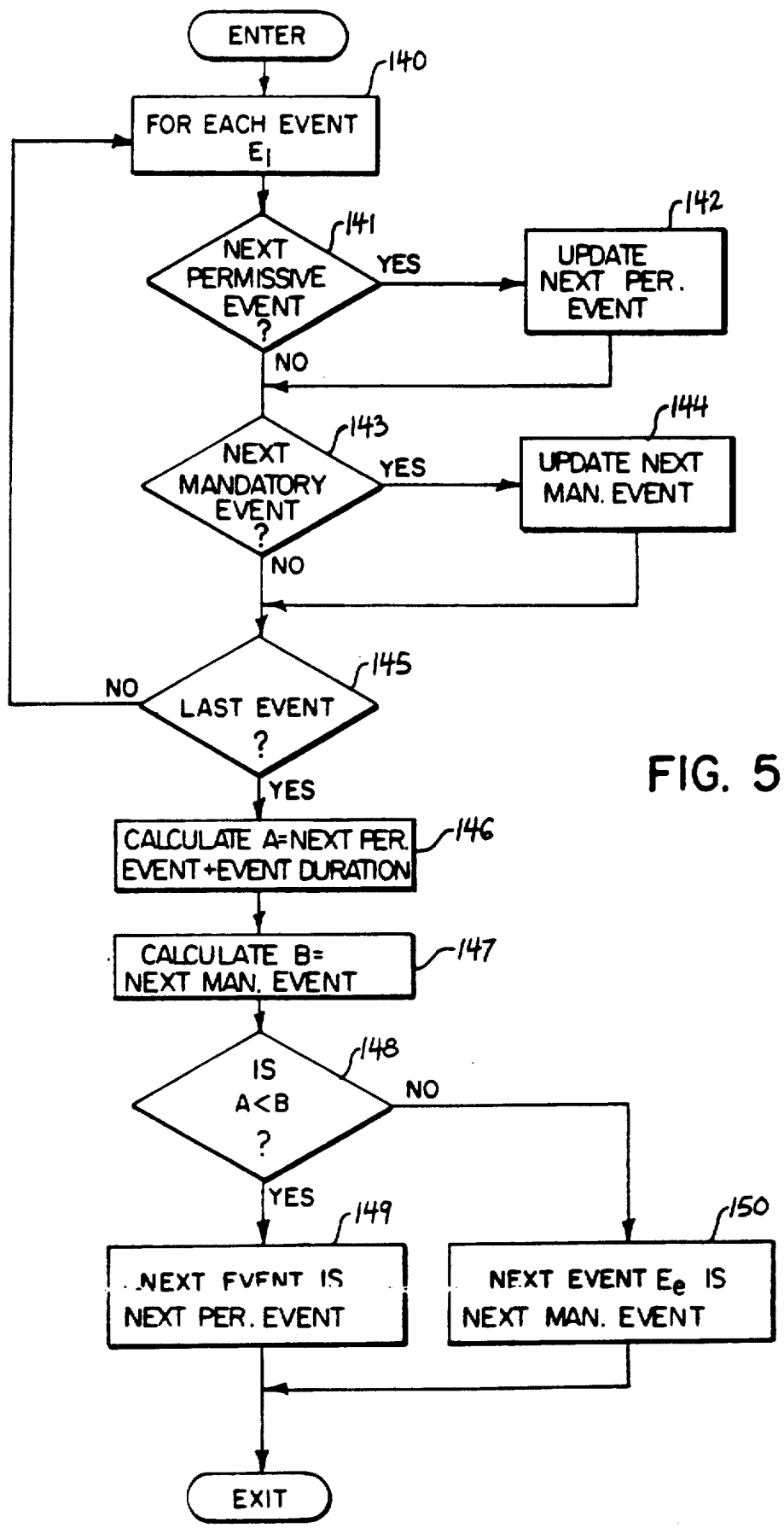
FIG. 5 is a detailed flow chart of the Scheduler Routine called by the I/O Scanner Routine of FIG. 3.

The main body of the scanner program is comprised of two major routines: a scheduler routine 109 which determines the next I/O unit to scan, and an I/O service routine 110 which handles the communications protocols necessary to scan the selected I/O unit. Referring to FIG. 5, the scheduler routine 109 scans each event $E_i$ of the event table in a loop formed by process blocks 140 and 143. Within that loop, as indicated by decision block 141, the permissive time $T_1(i)$ for each event is compared to a value $T_1^*$ which holds the lowest valued permissive time in the events scanned thus far. If $T_1(i) < T_1^*$, then the value of $T_1^*$ is replaced with the value of $T_1(i)$ at process block 142. The index value "i" for this event also is stored in the variable "p" at process block 142. Thus, the lowest valued permissive time $T_1$ of all the events $E_i$ and its index value i is obtained. The event with the lowest valued permissive time $T_1$ will be referred to as $E_p$.

In a similar manner, at decision block 143 and process block 144 the lowest valued mandatory time $T_2$ of all events $E_i$ is obtained and the index value i for the event with that mandatory time is stored in variable "m". The event with the lowest mandatory time will be referred to as $E_m$.

After all events $E_i$ have been scanned a value A is computed at process block 146, such that $$A = T_1(E_p) + ED(E_p) \qquad (1)$$

where $T_1(EP)$ and $ED(EP)$ represent the values of $T_1$ and ED for that event $E_p$. At process block 147 a value B is computed such that $$B = T_2(E_m) \qquad (2)$$

where $T_2(E_m)$ represents the value of $T_2$ for that event $E_m$.

These values A and B are compared at process block 148. A next event pointer, $E_e$, as shown in FIG. 6 in RAM 50, which points to the next event to be executed is set equal to $E_p$ if A is less than B and $E_m$ if A is not less than B per process blocks 149 and 150. In either case, the scheduler routine then exits to the I/O scanner control program shown in FIG. 3.

Referring to FIG. 3, the I/O scanner control program next calls the I/O service routine at 110 to execute event $E_e$ as selected by the scheduler program. At process block 113, shown in FIG. 4, $T_2(E_e)$, the mandatory event time associated with the next event $E_e$, is compared to the time indicated by the real time clock 52. If the mandatory event time $T_2(E_e)$ has already passed, the system branches and at process block 111, the event $E_e$ is checked to see if it is either an MCB event (b) or a discrete I/O event (a). Failure to timely execute these two types of events is considered a schedule "slippage" and is reported to the host computer 16 as a fault shown at process block 112. Slippage of other types of events are ignored. In either case the program returns to process block 120 to execute the event $E_e$.

If at process block 113 it is determined that the mandatory execution time $T_2(E_e)$ for the event has not lapsed, then at process block 114, the permissive event time for event $E_e$, $T_1(E_e)$ is compared to the real time clock 52 to see if the event $E_e$ may be executed at this time. If not, the program waits, by looping back to process block 114 to check the permissive event time $T_1(E_e)$ against a later value of the real-time clock 52.

Figure 4:
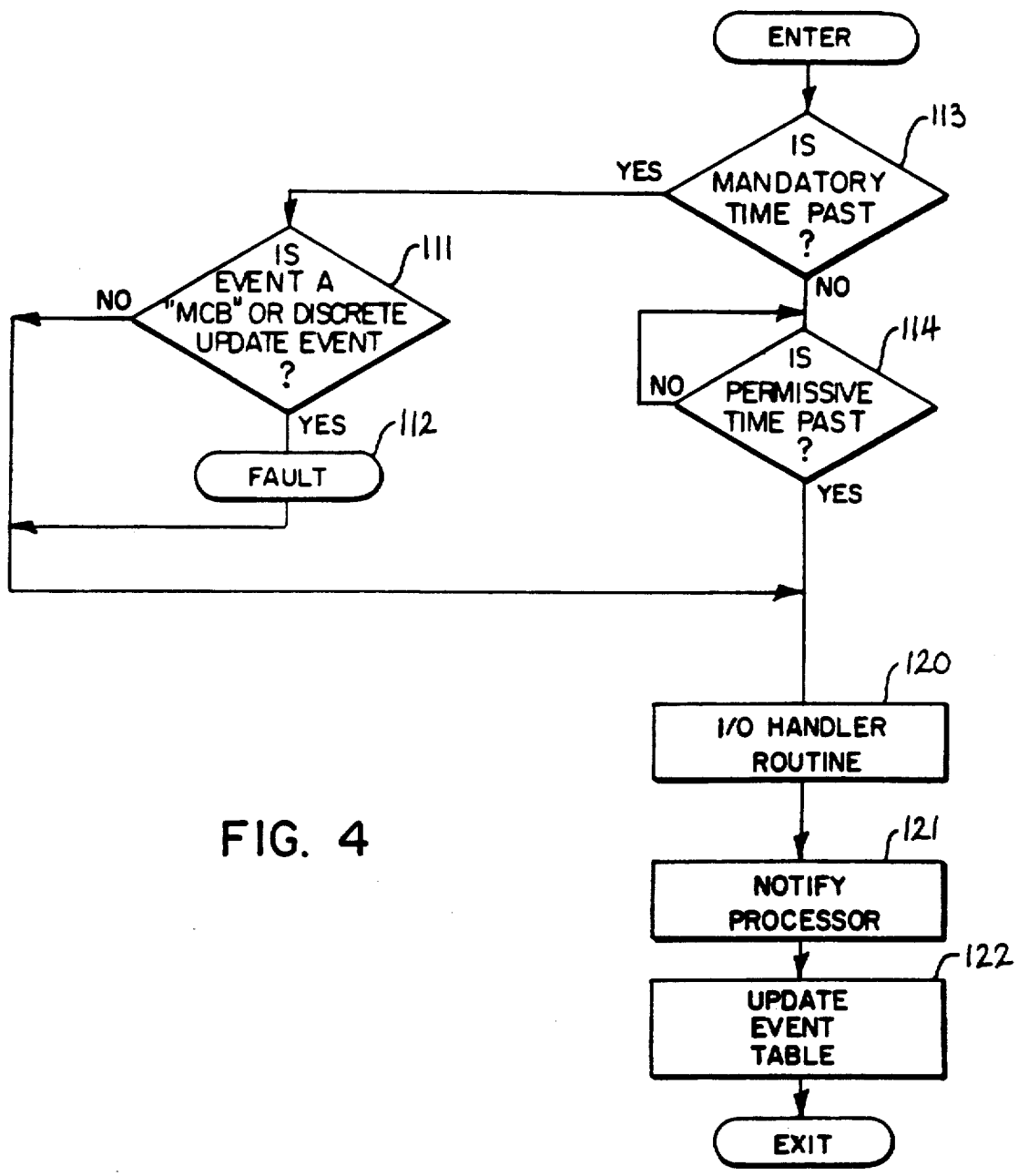
FIG. 4 is a detailed flow chart of the I/O Service Routine called by the I/O Scanner Routine of FIG. 3.

Referring still to FIG. 4, if at process block 114 the permissive event time $T_1(E_e))$ has been reached or passed the appropriate I/O handler routine is called at process block 120. The I/O handler routine examines event table element 164 for the address and communications protocol for the particular I/O module associated with the next event $E_e$ and executes the event according to standard communication techniques such as those disclosed in the previously cited U.S. Pat. No. 4,913,319.

As indicated by process block 121, host computer 16 may be notified of the event completion at process block 121. Next, at process block 122, the event table 164 is updated adding the interval I, or I plus a window value, to the actual time of the event's execution $T_0$ as indicated by the real time clock 52 to become the mandatory time $T_2$ and permissive time $T_1$ for the event $E_e$ just completed.

Referring again to FIG. 3, scanning continues until stopped by a command from the host computer 16 per process block 108. Each event in the table 164 (FIG. 7) is selected at various indicated rates and the I/O module corresponding to that event is updated by exchanging data with the I/O scanner module.

The above described procedure provides a simple method of ordering and executing a large number of events with differing update times so as to minimize event conflicts and resultant event failures. A preferred embodiment of the invention has been described, but it should be apparent to those skilled in the art that many variations can be made without departing from the spirit of the invention. For example, additional or different events may be accommodated for varying I/O module types.

I claim:

1. An I/O scanner for an industrial processor exchanging I/O data with I/O units during events, the I/O scanner comprising:

image table means for storing the I/O data associated with the events;

I/O service means coupled to image table means for performing an identified current event in which data is exchanged, at an execution time, between a selected I/O unit and the image table;

event table storage means for storing event data for each I/O module, the event data including a current permissive time and a current mandatory time for the performance of the events, and an even duration for the performance of the event;

real time clock means for indicating a current time;

scheduler means reading the current time from the real time clock and the event data from the event table storage means for identifying the current event to be performing by the I/O service means, the scheduler means including means for identifying a first event in the event table with the earliest current permissive time;

means for identifying a second event in the event table with the earliest current mandatory time;

means for identifying the first event as the identified current event if the earliest current permissive time plus the first event duration is less than the earliest current mandatory time, and otherwise identifying the second event as the identified current event; and an updating means communicating with the real time clock and the I/O service means and reading the execution time of the identified current event and for updating the event table to determine a next event.

2. The I/O scanner of claim 1 wherein the updating means determines the next permissive time by summing a predetermined event interval with the execution time, and determines the next mandatory time by summing the predetermined event interval plus a predetermined percentage of the event interval with the execution time.

3. The I/O scanner of claim 2 including additionally:

a configurable link for exchanging data between the I/O service means and the I/O module;

a user-defined configuration file including link configuration data for each I/O module, and user-defined update intervals for each I/O module;

a downloading means coupled to the user-defined configuration file for downloading the user defined update intervals into the event intervals of the event table; and an event duration calculation means reading the link configuration data for calculating event duration of the event table.

* * * * *

UNITED STATES PATENT AND TRADEMARK OFFICE
CERTIFICATE OF CORRECTION

PATENT NO. : 5,099,449
DATED : March 24, 1992
INVENTOR(S) : Dombrosky et al.

It is certified that error appears in the above-identified patent and that said Letters Patent is hereby corrected as shown below:

Col. 21, line 15, $T_1(i-)<T_1*$ should be $T_1(i)<T_1*$.

Signed and Sealed this

Twenty-second Day of June, 1993

Attest:

MICHAEL K. KIRK

*Attesting Officer*  *Acting Commissioner of Patents and Trademarks*